United States Patent Office 3,221,003
Patented Nov. 30, 1965

3,221,003
CHROMIUM COMPLEX MIXED AZO DYESTUFFS
Walter Scholl, Cologne-Mulheim, and Gerhard Dittmar, Leverkusen, Germany, assignors to Farbenfabriken Bayer Aktiengesellschaft, Leverkusen, Germany, a German corporation
No Drawing. Filed Dec. 18, 1962, Ser. No. 245,382
Claims priority, application Germany, Dec. 22, 1961, F 35,628, F 35,629; Mar. 16, 1962, F 36,292; Mar. 22, 1962, F 36,344
3 Claims. (Cl. 260—145)

The present invention concerns chromium containing dyestuffs. It also concerns processes for chroming dyestuffs. More particularly it relates to symmetrical 2:1-chromium complexes of azo dyestuffs of the formula

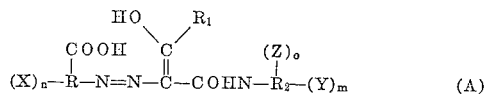

In this formula R represents a radical of the benzene series in which the —COOH group is in the o-position to the azo bridge, $R_1$ denotes a lower alkyl radical, $R_2$ is a monocyclic six-membered aryl radical, X means hydrogen, sulfonamido, N-substituted sulfonamido, lower alkyl sulfone, nitro or chloro groups and $n$ stands for the integer 1, Y stands for hydrogen, lower alkyl, lower alkoxy or chloro groups, $m$ stands for 1 or 2, Z means hydrogen or chloro and $o$ stands for the integer 1.

Furthermore the invention deals with asymmetrical chromium complex azo dyestuffs of the formula $$[I—Cr—II]^\ominus K^\oplus \quad (B)$$

wherein K stands for a cation, I is the radical of a monoazo dyestuff and II is the radical of a monoazo dyestuff differing from I and being of formula

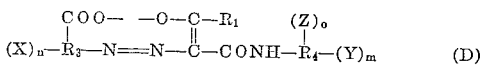

In the Formula D the radical $R_3$ stands for a residue of the benzene series bearing the complex bound —COO— group in o-position to the azo bridge, $R_1$ is a lower alkyl radical, $R_4$ stands for a monocyclic six-membered aryl radical, X means hydrogen, sulfonamido, N-substituted sulfonamido, lower alkyl sulfone, nitro or chloro groups, $n$ stands for the integer 1, Y means hydrogen, lower alkyl, lower alkoxy or chloro groups, $m$ is 1 or 2, Z stands for hydrogen or chloro and $o$ stands for the integer 1.

The present invention is also related to improved processes for chroming metallisable dyestuffs and for producing asymmetrical chromium complex dyestuffs which are obtainable from the action of a 1:1-chromium complex dye upon a metal-free, metallisable dyestuff devoid of o-hydroxy-o'-alkoxy-azo groupings; those improved processes are characterised by the co-use of formamide and are carried out at an elevated temperature of between 60° and 125° C.

It is an object of the invention to provide novel and valuable symmetrical chromium complexes of dyestuffs of the Formula A and to provide novel and valuable asymmetrical chromium complex azo dyestuffs of the Formula B. Another object is the provision of an improved process for chroming metallisable dyestuffs which is particularly advantageous when chroming is applied to water-insoluble dyestuffs or to barely water-soluble metallisable dyestuffs. Still another object is to provide an improved chroming process which avoids damaging or decomposing of dyestuffs when chromed, particularly when chroming monoazo dyestuffs prepared from diazotized o-anthranilic acid or its derivatives and usual coupling components. A further object is the provision of a chroming process which enables chroming of metallisable dyestuffs in an organic medium in comparatively short reaction times. Another object is to provide an improved process for building up so-called 2:1-chroming complex dyestuffs under relatively mild conditions. Still another object is the provision of improved processes for chroming metallisable dyestuffs and preparing 2:1-chromium complex dyestuffs in remarkably pure form.

In accordance with one object of this invention it has been found that valuable chromium-containing monoazo dyestuffs can be obtained when monoazo dyestuffs of the general formula

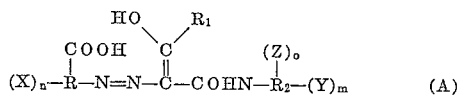

are treated with chromium yielding agents. In the above Formula A the radicals R, $R_1$, $R_2$, X, Y, Z, $m$, $n$, and $o$ have the aforementioned significance.

The chroming of the starting dyestuffs of Formula A is preferably carried out under such conditions that chromium complex compounds are formed which contain approximately two molecules of dyestuff combined with one atom of chromium (so-called 2:1-chromium complexes).

The starting dyestuffs of Formula A can be prepared according to methods known per se from diazotised anthranilic acids by coupling with acylacetic acid arylamides, the starting components of which may be further substituted in the manner described above. Apart from anthranilic acid itself, those substitution products of anthranilic acid are applicable as diazo components which, in addition to the carboxyl group intended for complex formation and in the o-position to the amino group, do not exhibit any further acid-dissociating water-solubilising (ionic groups; further substituents may not be linked via a nitrogen atom present in the phenyl nucleus of anthranilic acid; the following derivaties of anthranilic acid may, for example, be mentioned: 1-amino-2-carboxybenzene-5-sulfonic acid amide, 1-amino-2-carboxybenzene-4-sulfonamide, and their derivatives substituted on the amide nitrogen, such as 1-amino-2-carboxybenzene-5-sulphonic acid-methylamide, -dimethylamide, -methylhydroxyethylamide, -isopropylamide, -hydroxyethylamide, 1 - amino-2-carboxybenzene-5-methyl sulphone, -5-ethyl sulphone, 1-amino-2-carboxybenzene-4-methyl sulphone, -4-ethylsulphone, 1-amino-2-carboxy-5 - nitrobenzene, 1 - amino-2-carboxy-4-nitrobenzene 1-amino-2-carboxy-4- or -5-chloro-benzene and 1-amino-2-carboxy-3-chlorobenzene.

As suitable acylacetic acid arylamides, which must not contain any acid-dissociating (ionic) groups in the acyl radical and in the aryl nucleus of the arylamide group and no substituents which are linked to the acyl or aryl radical via a nitrogen atom, there may be mentioned inter alia the following compounds: acetoacetic acid anilide, acetoacetic acid-2'-chloroanilide, acetoacetic acid-2'.5'-dichloroanilide, acetoacetic acid-2'-methylanilide, acetoacetic acid-2',4'-dimethylanilide, aceto-acetic acid-2'-methoxyanilide acetoacetic acid-2',5'-dimethoxy-4'-chloroanilide.

For chroming the starting dyestuffs, consideration can be given to various processes known in the literature for producing so-called 2:1 complexes. The reaction with chromates in the presence of reducing carbohydrates in acid amides such as formamide, at an elevated temperature is particularly suitable. The co-use of formamide is also an object of this invention.

Of particular interest are asymmetric chromium mixed complex azo dyes of the formula

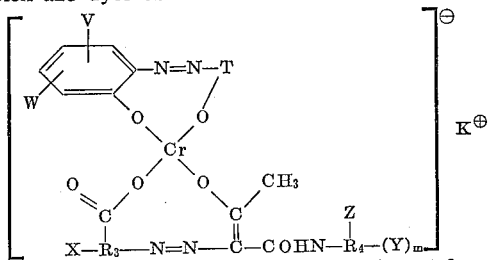

wherein K is a cation, V is a member selected from the group consisting of hydrogen, chloro, methoxy and nitro; W is a member selected from the group consisting of hydrogen and chloro; T the residue of a naphthol coupling compartment wherein the azo bridge and —O— stand in o-position to each other; $R_3$ is a radical of the benzene series wherein the —COO— group is in o-position to the azo bridge; $R_4$ is a monocycle 6-membered aryl radical; X is a member selected from the class consisting of hydrogen, sulfonamido, lower alkyl sulfonamido, lower alkyl sulfone, nitro and chloro; Y is a member selected from the group consisting of hydrogen, lower alkyl, lower alkoxy and chloro; $m$ is an integer of 1–2 and Z is a member selected from the group consisting of hydrogen and chloro.

The new chromium complexes of the dyestuffs of Formula A are particularly suitable for dyeing and printing nitrogen-containing fibres, such as wool, silk, synthetic polyamide and polurethane fibres. These types of fibre are dyed by the new dyestuffs in preponderantly yellow shades with good fastness properties.

In accordance with another object of this invention it has been found that valuable asymmetrical chromium mixed complex azo dyestuffs (ref. Formula B supra) can be obtained when a 1:1-chromium complex monoazo dyestuff (I) proportions with a metal-free monoazo dyestuff devoid of o-hydroxy-o′-alkoxy-azo groupings and having the Formula D, which is different in structure from (I).

In the formula D the radicals $R_3$, $R_4$, X, Y, Z, $m$, $n$ and $o$ have the aforementioned significance. The other monoazo dyestuff (I) may exhibit the above mentioned substituents or others common in azo dyestuffs, such as alkyl, alkoxy, halogen, nitro, sulfone, optionally N-substituted sulfonamide and carboxamide radicals, also acylamino and cyano substituents.

The starting dyestuffs of Formula D can be obtained by coupling diazotised anthranilic acid or its nuclear substitution products with acyl-acetic acid amides. The 1:1-chromium complex compounds of the monoazo dyestuffs (I), differing from (II), can also be obtained by known methods.

For the production of the monoazo dyestuff (II), having the Formula D, use can be made of anthranilic acid, anthranilic acid-4-sulfonic acid amide and anthranilic acid-5-sulfonic acid amide and derivatives being substituted on the amide nitrogen atom, such as anthranilic acid-4-sulfonic acid methylamide, -dimethylamide, N-methyl-N-hydroxyethylamide, anthranilic - 5 - methylsulfone or -5-ethylsulfone, nitroanthranilic acid, chloroanthranilic acid.

Suitable acylacetic acid arylamides are, e.g. acetoacetic acid anilide, -o-chloroanilide, -o-methylanilide, -2′,5′-dichloroanilide, and -o-anisidide.

Arbitrary monoazo dyestuffs can be employed as the metallisable dyestuff (I) different from (II), as long as they contain metallisable groupings in the o,o′-position to the azo group. In the first instance, consideration can be given to o,o′-dihydroxy, o-hydroxy-o′-alkoxy, o-hydroxy-o′-carboxy and o-hydroxy-o′-amino azo dyestuffs. Among the metallisable monoazo dyestuffs mention may in particular be made of those obtainable from diazotised o-aminophenols, o-aminophenol ethers, or o-aminophenyl carboxylic acids by coupling with α- or β-hydroxynapth-thalenes, 5-pyrazolones, 5-amino-pyrazoles, acyl-acetic acid amides, and hydroxybenzenes, where the starting component may be further substituted in an arbitrary manner.

Further processes for the production of such dyestuffs consist in reacting chromium yielding agents upon a mixture of dyestuffs (I) and (II), or by reaction of the 1:1 chromium complex compound of II with a monoazo dyestuff different from II. The chromium complex dyestuffs thus obtained however, are not pure, they deviate considerably, from the shade and dyeing properties of the pure chromium mixed complex, and usually behave less favorably. This process is therefore only employed in special cases. Suitable methods for chroming include, for instance, the action of chromium salicylate complexes, and treatment with chromates in the presence of reducing carbohydrates, such as glucose.

Various processes are known from the literature for the preparation of the 1:1 chromium complex compounds of I. These processes are carried out at temperatures of 100 to 150° C., in the open or under pressure in organic solvents such as ethylene glycol, with ordinary chromium salts, such as chromic chloride, and in the weakly acidic range (e.g. German patent specification No. 479,373); the above are particularly favorable.

The reaction of the thus obtainable 1:1 chromium complex compound with a metal-free monoazo dyestuff (D) is carried out in an aqueous or organic medium, in a weakly acidic, neutral, or preferably weakly alkaline range, in the presence of acid-binding agents, such as sodium acetate, sodium carbonate, dilute sodium hydroxide solution, or formamide.

The co-use of formamide is likewise an object of this invention.

The novel asymmetrical chromium mixed complex azo dyestuffs of Formula B are particularly well suited for dyeing and printing on nitrogen containing materials, particularly of fibre materials from wool, silk, synthetic polyamide and polyurethane fibres. Dyeings are obtained of different shades, which exhibit very good fastness properties, particularly good fastness to wet processing, light, milling and ironing. The dyestuffs also possess good drawing power.

As previously indicated another object of the invention is the provision of novel improved processes for chroming dyestuffs.

Numerous processes are known for the production of chromium-containing dyestuffs. For economic reasons, however, attempts are being made to work in an aqueous medium. Especially suitable processes are described in German patent specifications Nos. 741,462 and 929,567. These processes, however, cannot be applied successfully if the dyestuffs to be chromed possess insufficient water-solubility. When the described reaction conditions are applied to water-insoluble dyestuffs or to barely water-soluble, metallisable dyestuffs, frequently only an incomplete or no reason at all is observed. Furthermore, the dyestuffs are more or less damaged or decomposed by the long reaction times required.

In order to avoid the described difficulties, it has proved to be necessary to chrome in an organic medium. In German patent specification No. 715,082 it has been proposed to carry out metallisations with carboxylic acid amides as solvents, possibly in the presence of acid-neutralising agents. As chromium-yielding agents compounds of trivalent chromium, such as chromium formate and chromium acetate, were used. As is shown in the examples of the above-mentioned patent specification, such reactions require a comparatively long reaction time, in some cases up to 7 hours, when metallising sensitive dyestuffs, however, such a period leads to damage to the dyestuff.

It has now been found that chromium complex dyestuffs, and also chromium complexes of water-soluble dyestuffs, can be obtained in a particularly advantageous manner under mild conditions, provided the reaction of the dyestuff is carried out in a solution of the chromable dyestuff in formamide with the use of salts of hexavalent chromium, e.g. of alkali metal chromates and dichromates, at elevated temperature, preferably at 90°–120° C.

The reaction (chroming) takes place, in general, at temperatures of 80°–120° C.; it may also proceed, however, even at lower temperatures, e.g. 60° to 70° C., with sufficient velocity; this process is indicated when especially sensitive dyestuffs are used. It is also possible, but not generally necessary, to carry out the reaction at temperatures above 100° C., approximately up to 110° C.

The chroming can be carried out in such a manner that either (a) a solution of the dyestuff in formamide is mixed at room temperature with, for example, the equivalent amount of potassium bichromate and then heated or (b) the salt of hexavalent chromium is sprinkled into a dyestuff solution at an elevated temperature, e.g. at 70° to 125° C. The amount of chromium salt used must thereby be measured in such a manner that at least 1 atom of chromium is present per 2 molecules of dyestuff. Formamide proves to be particularly valuable and effective in this chroming process. The amount of formamide in the reaction mixture ranges from about 30% to about 95%, calculated on the total amount of the reaction mixture.

The formation of the chromium complex dyestuff takes place rapidly when the optimum reaction temperatures for the individual dyestuffs are reached or maintained, and is completed in a few minutes. As a result of the short reaction time and of the low temperatures to be used, the process is very mild and the chromium complexes of the dyestuffs employed are obtained in very good yields.

Dyestuffs of the most varied classes can be subjected to chroming according to the process of the invention, insofar as these contain chromable groups. Such chromable groups are, for example, the o,o'-dihydroxyazo, o,o'-dihydroxy - azomethine, o-hydroxy-o'-carboxyazo, o - hydroxy-o'aminoazo and the salicylic acid grouping. The process can be applied not only to individual dyestuffs but also to mixtures of different chromable dyestuffs. The initial dyestuffs can belong, inter alia, to the series of the watersoluble or water-insoluble monoazo and polyazo dyestuffs, azomethine dyestuffs, azoporphin and anthraquinone dyestuffs.

The chromium complex dyestuffs obtainable according to the new process are so-called 2:1-complexes, i.e. they contain 2 molecules of dyestuff bound to 1 chromium atom. A formation of other complex types, for example of the 1:1-complexes, practically does not occur. With the use of comparatively small reaction volumes the process enables the chroming of water-insoluble as well as of water-soluble, metallisable dyestuffs in an especially mild way.

The co-use of formamide also proves valuable in another process for preparing 2:1-chromium complex dyestuffs.

Chromium complex dye compounds which contain approximately 1 atom of chromium to 2 molecules of dyestuff, the so-called 2:1-complexes, are obtainable in two ways.

Firstly, the metallisation can be carried out under such conditions that the 2:1-complex compounds are formed at once. Processes of this kind are generally carried out in an alkaline range. Among the numerous processes described in the literature, those in German patent specifications Nos. 741,462 and 929,567 are especially suitable. If these methods are applied to mixtures of metallisable dyestuffs, say to the dyestuffs "E" and "F" (E and F possessing different constitutions), uniform chromium complex compounds are not obtained, but mixtures of dyestuffs which in the present case contain the three types of complex [E–Cr–E]⁻, [F–Cr–F]⁻ and [E–Cr–F]⁻.

It is therefore not possible by this method to obtain in pure form the uniform mixed complexes [E–Cr–F]⁻, which are particularly valuable for dyeing purposes.

Secondly, the 2:1-chromium complex dyestuffs, may be built up successively, and in such a manner that the 1:1-complex of one dyestuff, for example of E, is first prepared, and then reacted with a further molecule of the same dyestuff E to give [E–Cr–E]⁻, or with a second dyestuff F, different from E, to give [E–Cr–F]⁻. It is possible in this way to obtain the pure mixed complex [E–Cr–F]⁻.

The 1:1-chromium complex compounds required for the last-mentioned process are obtainable by various methods. Those methods are especially suitable which are carried out at 100–140° C., with or without pressure, in organic solvents such as ethylene glycol, with simple chromium salts such as chromic chloride, and in an acid medium (for example German patent spectification No. 479,373).

A reaction of the 1:1-chromium complex compound with a second molecule of the non-metallized dyestuff does not take place in this medium. The presence of acid-binding agents is, therefore, necessary. It has been suggested to use for this purpose, among others, sodium hydroxide solution, sodium carbonate and sodium acetate. In practice, the reaction is carried out such that the solution or suspension of the 1:1-dyestuff chromium complex is allowed to run at about 80° C. into the alkaline solution of the metal-free second reaction dyestuff. Two vessels are, therefore, necessary for this reaction, the first in the preparation of the 1:1-complex, and the second for the conversion into the 2:1-complex. The quantity of alkali must be such that an alkaline condition prevails at the end of the reaction. The solubility of the second dyestuff component to be reacted in an aqueous alkaline medium is a precondition for this process. Since, however, the solubility of non-metallized dyestuffs, especially of those free of sulphonic groups, is not very high and as, on the other hand, complete solution is a prerequisite for a quantitative reaction, large reaction volumes are frequently required. Moreover, the alkalies usually employed have a salting out effect on the non-metallized dyestuff, so that the solubilizing power of the reaction medium is further reduced by their presence.

In accordance with the invention it has now been found that the production of 2:1-chromium complex dyestuffs can be carried out in an especially advantageous manner without alkali in a single reaction vessel by working in the presence of formamide. In the process according to the invention, the dissolved metal-free dyestuff, which is devoid of o-hydroxy-o'-alkoxy-azo groupings and which has to be reacted with the 1:1-complex, is added in the presence of formamide to an acid solution, for example, in ethylene glycol, of the 1:1-chromium complex dyestuff; or the metal-free dyestuff devoid of o-hydroxy-o'-alkoxy azo groupings to be reacted is introduced in dry state into a solution of the 1:1-chromium complex dyestuff, and the necessary quantity of formamide then added. Owing to the good solubilising power of the formamide, only comparatively small quantities of this solvent are required. Small volumes are, therefore, sufficient for the process according to the invention; they amount to from about 10% to 50% calculated on the total weight of the reaction medium. Furthermore, those dyestuffs which possess an insufficient water-solubility or are sensitive to alkali can also be used for the reaction by the new method.

The reaction is carried out at an elevated temperature of between 75°–115° C., the reaction time depending on the nature of the dyestuff, and varies between 15 and 60 minutes but can also mount to more than an hour.

Dyestuffs of most diverse constitutions can be subjected to the process, as far as they are capable of forming 1:1- and/or 2:1-chromium complex compounds. The metal-free dyestuffs have to be free of o-hydroxy-o'-alkoxy azo groups; the dyestuffs on which the 1:1- chromium complex dyestuffs are based, may, for example, belong to the series of o,o'-dihydroxazo, o,o'-dihydroxy-azomethine, o-hydroxy-o'-carboxyazo, o-hydroxy-o'-alkoxyazo and o-hydroxy-o'-aminoazo dyestuffs. The metal-free dyestuffs may belong to the above indicated metallisable series of dyestuffs except to those dyestuffs which carry o-hydroxy-o'-alkoxyazo groupings. All o-hydroxy-o'-alkoxy dyestuffs shall be excluded from this reaction as a second metal-free metallisable dyestuff with which the 1:1-chromium complex dyestuff would have to be reacted, thus excluding in this reaction step any metallisation under de-alkylating conditions.

The starting and final dyestuffs to be used in the process according to this invention may also contain, in addition to any other substituents, sulfonic acid groups and free carboxylic acid groups, i.e. such not participating in the formation of complexes.

Symmetrical as well as asymmetrical 2:1-chromium complex dyestuffs can be produced by the new method, the advantages described above resulting therefrom. The process is, of course, of special interest for the production of the asymmetrical 2:1-chromium complex azo dyestuffs.

The following examples are to illustrate the invention without limiting it thereto; the parts by weight and parts by volume are related as kilograms are to litres.

Example 1

(a) 23.2 parts by weight of 2-amino-hydroquinone-dimethyl ether-5-sulphonamide are stirred with 50 parts by volume of water and 28 parts by volume of hydrochloric acid (d. 1.20). For cooling, 100 parts by weight of ice are added, and diazotisation is effected with a solution of 6.9 parts by weight of sodium nitrite in 25 parts by volume of water. The diazo solution thus obtained is added, with good stirring, at 0–5° C. to a solution of 23.7 parts by weight of 1-methyl-sulphonylamino-7-hydroxy-naphthalene in 100 parts by volume of water, 17 parts by volume of sodium hydroxide solution, and 140 parts by volume of 20 vol. percent carbonate solution. Coupling is completed after a few hours and the precipitated dyestuff is isolated; it corresponds to the formula

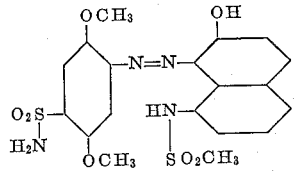

When dried, it is a dark powder which dissolves in dilute sodium hydroxide solution with a currant colour.

(b) 21.6 parts by weight of 2-amino-benzoic acid-4-sulphonamide are dissolved in 60 parts by volume of water and 19 parts by volume of 40 vol. percent sodium hydroxide solution, and treated with 23 parts by volume of 30 vol. percent sodium nitrite solution. For diazotisation, this solution is allowed to run into a previously prepared mixture of ice water and 46 parts by volume of hydrochloric acid (d. 1.20).

19.1 parts by weight of acetoacetic acid-2-methylanilide are dissolved in 60 parts by volume of water and 12 ml. of 40 vol. percent sodium hydroxide solution. The mixture is cooled to 0° C. with ice, treated with 140 ml. of 20 vol. percent sodium carbonate solution, and coupled by allowing the diazotisation to run in. Coupling is completed after a few hours, and the precipitated dyestuff is isolated. It corresponds to the formula

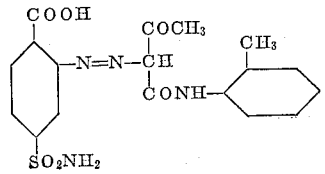

When dried, it is a yellow powder, which dissolves in water or in dilute sodium hydroxide solution with a yellow colour.

(c) 48 parts by weight of the monoazo dyestuff obtained according to (a) are introduced into 600 parts by volume of ethylene glycol, treated with 26 parts by weight of crystalline chromic chloride, and stirred at 145° C. for 8 hours. It is then allowed to cool down to 100° C., 41.8 parts by weight of the monoazo dyestuff obtained according to (b) and 50 parts of formamide are added, and the reaction solution is stirred for about 90 minutes. After this time, the chromium mixed complex has formed. For isolation, the solution is poured into 10,000 parts by volume of water, and the dyestuff is separated by sprinkling in 2000 parts by weight of rock salt. The dried chromium mixed complex dyestuff is a dark powder which readily dissolves in water with a green colour, and dyes wool very fast and uniformly to clear green shades from a neutral to organic acid bath.

Example 2

(a) 19.2 parts by weight of 4,5-dichloro-2-amino-1-methoxy-benzene are stirred in 70 parts by volume of water and 28 parts by volume of hydrochloric acid (d. 1.20), and after cooling down to 0° C. diazotised by the addition of a solution of 6.9 parts by weight of sodium nitrite in 20 parts by volume of water.

The diazo solution thus obtained is allowed to run at 0° C., with good stirring, into a solution of 23.7 parts by weight of 1-methyl-sulphonylamino-7-hydroxy-naphthalene in 100 parts by volume of water, 15 parts by volume of sodium hydroxide solution (40%) and 120 parts by volume of a 20% sodium carbonate solution. Coupling is completed after a few hours. The precipitated dyestuff is isolated and dried. A red powder is obtained.

(b) 21.6 parts by weight of 2-amino-benzoic acid-4-sulphonamide are diazotised according to Example 1b and coupled with 17.7 parts by weight of acetoacetic acid anilide. There is obtained a dyestuff which, when dry, is a yellow powder which readily dissolves in water and a dilute sodium hydroxide solution, and with a yellow colour.

(c) 44 parts by weight of the monoazo dyestuff obtained according to (a) are introduced with stirring into 500 parts by volume of ethylene glycol, treated with 27 parts by weight of crystalline chromic chloride, and stirred at 145° C. for 11 hours. The mixture is then cooled down to 100° C., and 40.4 parts by weight of the monoazo dyestuff obtained according to (b) and 50 parts by volume of formamide are added, and stirred at 100° C. for 1¾ hours. The solution of the chromium mixed complex dyestuff is poured into 9000 parts by volume of water, and the dyestuff separated by sprinkling in 500 parts by weight of rock salt. When dried the dyestuff is a dark powder, which readily dissolves in water and dyes wool to fast green shades which are somewhat bluer than the dyeings with the dyestuff of Example 1.

Example 3

(a) 18.8 parts by weight of 4-chloro-2-amino-1,5-dimethoxybenzene are ground in a mortar with 28 parts by volume of hydrochloric acid (d. 1.20), diluted with 70 parts by volume of water, and after cooling down to 0–5° C., diazotised by the addition of a solution of 6.9 parts by weight of sodium nitrite in 25 parts by volume of water.

The diazo solution thus obtained is allowed to run, with good stirring at 0° C., into a solution of 23.6 parts by weight of 4'-hydroxy-naphtho-(2',1':4,5)-oxathiol-S-dioxide in 150 parts by volume of water, 14 parts by volume of sodium hydroxide solution, and 150 parts by volume of 20 vol. percent soda solution. After a few hours, coupling is completed and the precipitated dyestuff is isolated, which corresponds to the formula

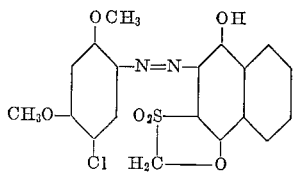

When dried, the dyestuff is a dark powder.

(b) 43.5 parts by weight of this monoazo dyestuff is stirred into 500 parts by volume of ethylene glycol, treated with 27 parts by weight of crystalline chromic chloride, and stirred at 145° C. for 6 hours. The mixture is allowed to cool down to 100° C., and 40.4 parts by weight of the monoazo dyestuff (obtained according to Example 2b) and 50 parts by volume of formamide are introduced. The mixture is kept at 100° C. for 2½ hours, with stirring, and the reaction solution poured into 6000 parts by volume of water. The chromium mixed complex dyestuff is separated by sprinkling in 300 parts by weight of rock salt. The dried dyestuff is a dark powder, which readily dissolves in water with a green colour and dyes wool from a neutral to organic acid bath to fast green shades.

*Example 4*

40.2 parts by weight of the monoazo dyestuff 4-nitro-2-amino-phenol→1 - methyl - sulphonylamino-7-hydroxy-naphthalene (obtained in accordance with German Patent 951,749, Example 7) and 40.4 parts by weight of the monoazo dyestuff 2-amino-benzoic acid 4-sulphonamide→acetoacetic anilide are stirred into 400 parts by volume of formamide, heated to 100° C., and treated in the course of one hour with small portions of altogether 16.5 parts by weight of sodium bichromate and 15 parts by weight of glucose. The product is stirred for another 30 minutes, and the reaction solution poured into 8000 parts by volume of water. The new dyestuff is separated by sprinkling in 800 parts by weight of rock salt, and isolated. After drying, a dark powder is obtained which readily dissolves in water and dyes wool in an olive-green colour.

*Example 5*

(a) 13.7 parts by weight of 2-amino-benzoic acid are stirred with 100 parts by volume of water and 27 parts by volume of hydrochloric acid (d. 1.20), cooled to 0° C., and diazotised with a solution of 6.9 parts by weight of sodium nitrite in 25 parts by volume of water. The diazo compound is added at 0–5° C. with stirring to a solution of 17.7 parts by weight of acetoacetic acid anilide in 50 parts by volume of water, 12 parts by volume of a 40 vol. percent sodium hydroxide solution, and 140 parts by volume of a 20 vol. percent sodium carbonate solution. Coupling is completed after a few hours. The dyestuff is isolated, and a yellow powder is obtained after drying.

(b) 32.5 parts of the monoazo dyestuff obtained according to (a) and 34.5 parts by weight of the monoazo dyestuff 2-aminophenol-4-sulphonamide→β-naphthol are stirred into 400 parts by volume of formamide, and treated at 100° C. in the course of 2 hours with small portions of altogether 16.5 parts by weight of sodium bichromate and 16 parts by weight of glucose. The mixture is stirred for a short while, the reaction solution then poured into 8000 parts by volume of water; the chromium complex dyestuff is separated by the addition of 400 parts by weight of rock salt, and isolated. The resultant product is a dark powder which dissolves in water, and dyes wool fast and uniformly in brown shades from a neutral to organic acid bath.

*Example 6*

37.3 parts by weight of the monoazo dyestuff 2-amino-phenol - 4 - sulphonamide→1 - phenyl - 3 - methyl - 5 -pyrazolone are introduced into 300 parts by volume of ethylene glycol, treated with 26 parts by weight of crystalline chromic chloride, and heated with stirring at 125–130° C. for 7 hours. The resulting mixture is allowed to cool down to 100–105° C., 32.5 parts by weight of the monoazo dyestuff 2-amino-benzoic acid→acetoacetic acid anilide, 50 parts by volume of formamide are added thereto, and the whole stirred at 100–105° C. for another 1½ hours. The reaction mixture is thereafter poured into 5000 parts by volume of water, and the chromium mixed complex dyestuff separated by sprinkling in 250 parts by weight of rock salt. The dyestuff is isolated. After drying it is a brown powder which readily dissolves in water and dyes wool fast and uniformly in bright orange shades from a neutral to organic acid bath.

*Example 7*

In accordance with the methods illustrated in Examples 1–3 and 6, valuable asymmetrical chrominum mixed complex compounds are also obtained by use of the monoazo dyestuffs specified in the following table, which dye wool in the stated shades.

| Monoazo dyestuff I (introduced as 1:1 chromium complex) | Monoazo dyestuff II | Dye shade of the dyeing of the chromium complex dyestuff on wool |
|---|---|---|
| 1-amino-2-hydroxy-5-nitrobenzene→2-hydroxy-8-methyl-sulphonyl-amino-naphthalene. | 1-amino-2-carboxybenzene-5-sulphonamide→acetoacetic anilide. | Olive green. |
| 1-amino-2-methoxy-4-nitrobenzene→2-hydroxy-8-methyl-sulphonyl-amino-naphthalene. | 1-amino-2-carboxybenzene-5-sulphonamide→acetoacetic anilide. | Green. |
| 1-amino-2-hydroxy-5-chlorobenzene-4-sulphonamide→4′-hydroxy-naphtho-(2′, 1′:4,5)-oxathiol-S-dioxide. | 1-amino-2-carboxybenzene-5-sulphonamide→acetoacetic anilide. | Do. |
| 1-amino-2-methoxy-4-nitrobenzene→2-hydroxy-8-methyl-sulphonyl-amino-naphthalene. | 1-amino-2-carboxybenzene-5-sulphonamide→acetoacetic acid-(2′,4′-dimethyl-anilide). | Do. |
| 1-amino-2-methoxy-4-nitrobenzene→2-hydroxy-8-methyl-sulphonyl-amino-naphthalene. | 1-amino-2-carboxybenzene-5-sulphonamide→acetoacetic acid-2′-methoxy-anilide. | Do. |
| 1-amino-2-hydroxy-5-chlorobenzene-4-sulphonamide→4′-hydroxy-naphtho-(2′-1′:4,5)-oxathiol-S-dioxide. | 1-amino-2-carboxy-5-chlorobenzene→acetoacetic anilide. | Do. |
| 1-amino-2-hydroxy-5-chlorobenzene-4-sulphonamide→4′-hydroxy-naphtho-(2′,1′:4,5)-oxathiol-S-dioxide. | 1-amino-2-carboxy-4-chlorobenzene→acetoacetic anilide. | Do. |
| 1-amino-2,5-dimethoxy-benzene-4-sulphonamide→4′-hydroxynaphtho-(2′,1′:4,5)-oxathiol-S-dioxide. | 1-amino-2-carboxybenzene-5-sulphonamide→acetoacetic anilide. | Do. |
| 1-amino-2,5-dimethoxybenzene-4-sulphonamide→2-hydroxy-8-methyl-sulphonylamino-naphthalene. | 1-amino-2-carboxybenzene-5-sulphonamide→acetoacetic anilide. | Do. |
| 1-amino-2-methoxy-4-(N-methyl-N-methyl-sulphonyl)-aminobenzene→2-hydroxy-8-methylsulphonylamino-napthtalene. | 1-amino-2-carboxybenzene-5-sulphonamide→acetoacetic anilide. | Do. |
| 1-amino-2,5-dimethoxy-4-nitrobenzene→2-hydroxy-8-methylsulphonyl-aminonaphthalene. | 1-amino-2-carboxybenzene-5-sulphonamide→acetoacetic anilide. | Do. |
| 1-amino-2-methoxy-4,5-dichlorobenzene→4′-hydroxy-naphtho-(2′,1′:4,5)-oxathiol-S-dioxide. | 1-amino-2-carboxybenzene-5-sulphonamide→acetoacetic anilide. | Do. |
| 1-amino-2-methoxy-4-nitro-5-methyl-benzene→2-hydroxy-8-methylsulphonylaminonaphthalene. | 1-amino-2-carboxybenzene-5-sulphonamide→acetoacetic anilide. | Do. |
| 1-amino-2-methoxy-4-chloro-5-methylbenzene→2-hydroxy-8-methylsulphonylaminonaphthalene. | 1-amino-2-carboxybenzene-5-sulphonamide→acetoacetic anilide. | Do. |
| 1-amino-2-methoxy-4-nitro-5-methylbenzene→4′-hydroxy-naphtho-(2′,1′:4, 5)-oxathiol-S-dioxide. | 1-amino-2-carboxybenzene-5-sulphonamide→acetoacetic anilide. | Do. |

| Monoazo dyestuff I (introduced as 1:1 chromium complex) | Monoazo dyestuff II | Dye shade of the dyeing of the chromium complex dyestuff on wool |
|---|---|---|
| 1-amino-2,4-dimethoxybenzene→4'-hydroxy-naphtho-(2',1':4,5)-oxathiol-S-dioxide. | 1-amino-2-carboxybenzene-5-sulphonamide→acetoacetic anilide. | Green. |
| 1-amino-2,5-dimethoxy-4-chlorobenzene→4'-hydroxynaphtho-(2'-1':4,5)-oxathiol-S-dioxide. | 1-amino-2-carboxybenzene-5-sulphonamide→acetoacetic anilide. | Do. |
| 1-amino-2,4-dimethoxybenzene→2-hydroxy-8-methylsulphonylaminonaphthalene. | 1-amino-2-carboxybenzene-5-sulphonamide→acetoacetic anilide. | Do. |
| 1-amino-2,4-dimethoxy-5-chlorobenzene→2-hydroxy-8-methylsulphonylaminonaphthalene. | 1-amino-2-carboxybenzene-5-sulphonamide→acetoacetic anilide. | Do. |
| 1-amino-2,5-dimethoxy-4-chlorobenzene→2-hydroxy-8-methylsulphonylaminonaphthalene. | 1-amino-2-carboxybenzene-5-sulphonamide→acetoacetic anilide. | Do. |
| 1-amino-2,5-dimethoxybenzene-4-sulphonamide→4'-hydroxynaphtho-(2',1':4,5)-oxathiol-S-dioxide. | 1-amino-2-carboxybenzene-5-sulphonamide→acetoacetic acid-2'-methylanilide. | Do. |
| 1-amino-2,5-dimethoxybenzene-4-sulphonamide→2-hydroxy-8-methylsulphonylaminonaphthalene. | 1-amino-2-carboxybenzene-4-sulphomethylamide→acetoacetic anilide. | Do. |
| 1-amino-2-hydroxybenzene-5-sulphodimethylamide→4'-hydroxynaphtho-(2',1':4,5)-oxathiol-S-dioxide. | 1-amino-2-carboxybenzene-4-sulphomethylamide→acetoacetic anilide. | Olive green. |
| 1-amino-2,5-dimethoxybenzene-4-sulphonamide→2-hydroxy-8-methylsulphonylaminonaphthalene. | 1-aminobenzene-2-carboxylic acid→acetoacetic anilide. | Green. |
| 1-amino-2-methoxy-4,5-dichlorobenzene→2-hydroxy-8-methylsulphonylaminonaphthalene. | 1-aminobenzene-2-carboxylic acid→acetoacetic anilide. | Do. |
| 1-amino-2,5-dimethoxy-4-chlorobenzene→2-hydroxy-8-methylsulphonylaminonaphthalene. | 1-amino-2-carboxybenzene-5-sulphonamide→acetoacetic acid-2'-methylanilide. | Do. |
| 1-amino-2,5-dimethoxy-4-chlorobenzene→2-hydroxy-8-methylsulphonylaminonaphthalene. | 1-amino-2-carboxybenzene-5-sulphomethylamide→acetoacetic acid-2'-chloroanilide. | Do. |
| 1-amino-2,5-dimethoxy-4-chlorobenzene→2-hydroxy-8-methylsulphonylaminonaphthalene. | 1-amino-2-carboxybenzene-5-sulphodimethylamide→acetoacetic anilide. | Do. |
| 1-amino-2,5-dimethoxy-4-chlorobenzene→2-hydroxy-8-methylsulphonylaminonaphthalene. | 1-amino-2-carboxybenzene-5-sulphonamide→acetoacetic acid-2',5'-dimethoxy-4'-chloroanilide. | Do. |
| 1-amino-2-methoxy-4-nitrobenzene→2-hydroxy-8-methylsulphonylaminonaphthalene. | 1-amino-2-carboxybenzene→acetoacetic acid-4'-sulphamido-anilide. | Do. |
| 1-amino-2-methoxy-4,5-dichlorobenzene→2-hydroxy-8-methylsulphonylaminonaphthalene. | 1-amino-2-carboxybenzene→acetoacetic acid-4'-sulphamido-anilide. | Do. |
| 1-amino-2-methoxy-5-chlorobenzene→2-hydroxy-8-methylsulphonylaminonaphthalene. | 1-amino-2-carboxybenzene→acetoacetic acid-4'-sulphamido-anilide. | Do. |
| 1-amino-2,5-dimethoxy-4-chlorobenzene→4'-hydroxynaphtho-(2',1':4,5)-oxathiol-S-dioxide. | 1-amino-2-carboxybenzene→acetoacetic acid-4'-sulphamido-anilide. | Do. |
| 1-amino-2,5-dimethoxy-4-chlorobenzene→4'-hydroxynaphtho-(2',1':4,5)-oxathiol-S-dioxide. | 1-amino-2-carboxybenzene-5-sulphonamide→acetoacetic acid-2'-methylanilide. | Do. |
| 1-amino-2,5-dimethoxy-4-chlorobenzene→4'-hydroxynaphtho-(2',1':4,5)-oxathiol-S-dioxide. | 1-amino-2-carboxybenzene-5-sulphonamide→acetoacetic acid-3'-chloroanilide. | Do. |
| 1-amino-2-hydroxybenzene-5-ethylsulphone→1-phenyl-3-methyl-5-aminopyrazole. | 1-amino-2-carboxybenzene-5-sulphonamide→acetoacetic anilide. | Dull orange. |
| 1-amino-2-hydroxy-5-chlorobenzene-4-sulphonamide→4'-hydroxynaptho-(2',1':4,5)-oxathiol-S-dioxide. | 1-amino-2-carboxy-4-nitrobenzene→acetoacetic anilide. | Green. |

*Example 8*

1 part by weight of the chromium mixed complex dyestuff obtained as described in Example 2 is dissolved in 4000 parts by volume of water and treated with 5 parts of weight of ammonium acetate. 100 parts by weight of woolen yarn are introduced into the dye bath at 50° C. and the bath heated to the boil within 20 minutes. It is subsequently boiled for 1 hour. The woolen yarn is then rinsed and dried; a bright green dyeing with good fastness properties is obtained.

*Example 9*

13.7 parts by weight of 2-aminobenzoic acid are stirred into 100 parts by volume of water and 27 parts by volume of hydrochloric acid (d. 1.20), cooled to 0° C., and diazotised with a solution of 6.9 parts by weight of sodium nitrite and 25 parts by volume of water. The diazo compound is added with stirring at 0–5° C. to a solution of 17.7 parts by weight of acetoacetic anilide in 50 parts by volume of water, 12 parts by volume of a 40 vol. percent sodium hydroxide solution and 140 parts by volume of a 20 vol. percent sodium carbonate solution. Coupling is completed after a few hours. The dyestuff is isolated, and a yellow powder is obtained after drying.

32.4 parts by weight of this monoazo dyestuff are stirred into 200 parts by volume of formamide, heated to 100° C., and treated within 1½ hours by small portions of altogether 8 parts by weight of sodium bichromate and 7.6 parts by weight of glucose. The reaction mixture is then poured into 1500 parts by volume of water, and the dyestuff is separated by sprinkling in 150 parts by weight of rock salt and isolated.

When dried, the chromium complex dyestuff is a yellow-brown powder, which dyes wool in greenish yellow shades from a neutral to organic acid bath.

*Example 10*

21.6 parts by weight of 1-amino-2-carboxybenzene-5-sulphonamide are dissolved in 60 parts by volume of water and 19 parts by volume of a 40 vol. percent sodium hydroxide solution and thereafter treated with 23 parts by volume of a 30% sodium nitrite solution. This solution is added dropwise to a prepared mixture of ice-water and 46 parts by volume of hydrochloric acid (d. 1.20).

17.7 parts by weight of acetoacetic acid anilide are dissolved in 70 parts by volume of water and 12 parts by volume of a 40 vol. percent sodium hydroxide solution. It is then cooled to 0° C. with ice, treated with 140 parts by volume of a 20 vol. percent sodium carbonate solution; the diazonium salt solution is allowed to run in and coupling is completed after a few hours. The precipitated dyestuff is isolated and it corresponds to the formula

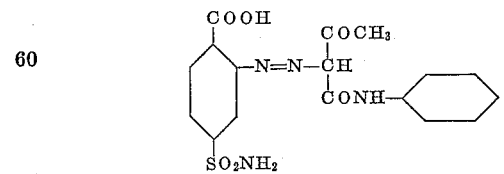

when dried it is a yellow powder, which readily dissolves in water and dilute sodium hydroxide solution with a yellow colour.

40.4 parts by weight of the dyestuff thus obtained are stirred into 200 parts by volume of formamide, heated to 100° C., and treated by portions of altogether 7.6 parts by weight of sodium bichromate and 7.6 parts by weight of glucose. Chroming is completed within about 1½ hours. The reaction mixture is poured into 1500 parts by volume of water, salted out with 300 parts by weight of rock salt, and filtered off with suction. The filter cake is washed several times with a 20% rock salt solution and then dried.

The dried dyestuff is a yellow powder which very readily dissolves in water with a yellow colour. Wool is dyed therewith in fast greenish yellow shades from a neutral to organic acid bath.

Dyestuffs with similar properties are obtained when instead of 1-amino-2-carboxybenzene-5-sulphonamide there is used 1-amino-2-carboxybenzene-5-sulphomethylamide or -5-sulphodimethylamide; otherwise the procedure is analogous.

*Example 11*

23 parts by weight of 1-amino-2-carboxybenzene-4-sulphomethylamide are diazotised and allowed to run at 0–5° C. into a solution of 17.7 parts by weight of acetoacetic acid anilide in 80 parts by volume of water, 12 parts by volume of a 40 vol. percent sodium hydroxide solution and 140 parts by volume of a 20 vol. percent sodium carbonate solution. The precipitated dyestuff can be isolated after a few hours. The dried yellow dyestuff readily dissolves in water and dilute sodium hydroxide solution.

41.8 parts by weight of this monoazo dyestuff are heated with stirring to 100° C. in 200 parts by volume of formamide. 8.2 parts by weight of sodium bichromate and 7.6 parts by weight of glucose are then added in small portions in the course of one hour. Stirring is continued for another 30 minutes, and the solution with the chromed dyestuff is poured into 2000 parts by volume of water. The chromium complex dyestuff is precipitated by sprinkling in 300 parts by weight of rock salt. The product is filtered off with suction and washed several times with a 5% rock salt solution. After drying, a yellow-brown powder is obtained, which dissolves in water and dyes wool in greenish yellow shades from a neutral to organic acid bath.

Dyestuffs with similar properties are obtained, when -4-sulphonamide or -4-sulphodimethylamides are employed in place of the 1-amino-2-carboxybenzene-4-sulphomethylamide.

*Example 12*

17.1 parts by weight of 1-amino-2-carboxy-4-chlorobenzene are dissolved in 70 parts by volume of water and 12 parts by volume of a 40 vol. percent sodium hydroxide solution; the solution is then treated with 6.9 parts by weight of sodium nitrite in 25 parts by volume of water and poured into a prepared mixture of ice-water and 35 parts by volume of hydrochloric acid (d. 1.20). Stirring is continued for another 30 minutes and then poured into a solution of 17.7 parts by weight of acetoacetic acid anilide in 70 parts by volume of water, 12 parts by volume of a 40 vol. percent sodium hydroxide solution and 140 parts by volume of a 20 vol. percent sodium carbonate solution, cooled to 0° C. Coupling proceeds rapidly, and the precipitated dyestuff can be isolated after a few hours and dried.

35.8 parts by weight of this monoazo dyestuff are stirred into 200 parts by volume of formamide and heated to 100° C. 8 parts by weight of sodium bichromate and 7.6 parts by weight of glucose are introduced in small portions with stirring, within one hour. After completion of chroming, the reaction solution is poured into 1500 parts by volume of water. The resultant chromium complex dyestuff is separated by sprinkling in 100 parts by weight of rock salt. After being filtered off with suction, the dyestuff is washed with some water and dried. A brown powder is obtained, which dyes wool in greenish yellow shades from an organic acid to netural bath.

*Example 13*

21.6 parts by weight of 1-amino-2-carboxybenzene-5-sulphonamide are diazotised as described in Example 10 and added to a solution of 20.7 parts by weight of aceto- acetic acid→2′-methoxyanilide in 70 parts by volume of water, 16 parts by volume of a 40 vol. percent sodium hydroxide solution and 140 parts by volume of a 20 vol. percent sodium carbonate solution. After completion of the coupling, the precipitated dyestuff is filtered off with suction and dried.

43.4 parts by weight of this monoazo dyestuff are introduced into 200 parts by volume of formamide, stirred, and heated to 100° C. In the course of one hour, 8 parts by weight of sodium bichromate and 7.6 parts by weight of glucose are introduced in small portions. After completion of the chroming the reaction solution is poured into 2000 parts by volume of water, and the chromium complex dyestuff is salted out with 500 parts by weight of rock salt. After filtering off with suction and drying, a brown-yellow powder is obtained. This is readily soluble in water and dyes wool in greenish yellow shades from a neutral to organic acid bath. The dyeings are a little more red than the dyeings with the dyestuff described in Example 9.

By analogous method, the 2:1 chromium complex compounds of the monoazo dyestuffs specified in the following table are obtained, which dye wool to the stated colour shades.

| Structure | Colour |
|---|---|
| ![structure with COOH, N=N-CH(COCH₃)-CONH-phenyl-CH₃, SO₂NH₂] | Yellow. |
| ![structure with COOH, N=N-CH(COCH₃)-CONH-phenyl, O₂N-] | Do. |
| ![structure with COOH, N=N-CH(COCH₃)-CONH-phenyl, NO₂] | Do. |
| ![structure with COOH, N=N-CH(COCH₃)-CONH-phenyl, Cl-] | Do. |
| ![structure with COOH, N=N-CH(COCH₃)-CONH-phenyl-CH₃] | Do. |

*Example 14*

1 part by weight of the chromium complex dyestuff obtained according to Example 10 is dissolved in 4000 parts by volume of water and treated with 5 parts by weight of ammonium acetate. 100 parts by weight of wool yarn are introduced at 50° C. into the dye bath, and the bath heated to the boil within 20 minutes. Boiling is then continued for one hour. The wool yarn is then rinsed and dried and a yellow dyeing with good fastness properties is obtained.

*Example 15*

35.7 parts by weight of the monoazo dyestuff 1-amino-2-carboxybenzene→1-(2′-chlorophenyl)-3-methyl-5-pyrazolone are stirred into 150 parts by volume of formamide, heated to 100° C. and mixed portionwise, within 2 hours, with a total of 8.3 parts by weight of sodium bichromate. Stirring is continued for a further 2 hours at 100° C. and the reaction mixture is poured into 1500 parts by volume of water and the chromium complex dyestuff separated out by the sprinkling in of 70 parts by weight of rock salt.

The isolated and dried 2:1-chromium complex dyestuff is a brown powder which readily dissolves in water and dyes wool from a neutral to organic acidic bath in fast yellow shades.

*Example 16*

40 parts by weight of the monoazo dyestuff 1-amino-2-carboxybenzene - 5 - sulphonamide→aceto - acetic acid anilide are stirred into 200 parts by volume of formamide, heated to 100° C. and mixed portionwise with a total of 8 parts by weight of sodium dichromate within 40 minutes. Stirring is continued for a further 10 minutes and the reaction mixture then poured into 1500 parts by volume of water. For the separation of the chromium complex dyestuff, 300 parts by weight of rock salt are sprinkled in. After filtering off with suction, the chromium-containing 2:1-complex dyestuff is dried.

The dried dyestuff is a powder which is readily soluble in water and which dyes wool from a neutral to organic acidic bath in greenish-yellow shades.

*Example 17*

13.44 parts by weight of the monoazo dyestuff 1-amino-2 - hydroxy - benzene - 5 - sulphonic acid dimethylamide→4' - hydroxynaphtho - (2',1',:4,5) - oxathiol - 5-dioxide of the formula:

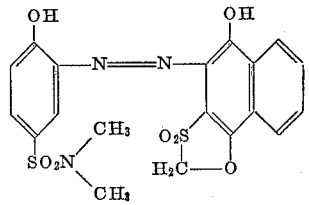

are introduced into 100 parts by volume of formamide, heated to 100° C. and mixed, within 15 minutes, with 2.2 parts by weight of sodium bichromate. Stirring is continued for a further 15 minutes and the solution of the chromium complex dyestuff poured into 700 parts by volume of water. For the separation of the dyestuff, 10 parts by weight of rock salt are sprinkled in and the mixture is heated to 60°. The 2:1-chromium complex thus obtaintable is a dark blue powder which dyes wool in fast blue shades.

*Example 18*

10.72 parts by weight of the monoazo dyestuff 1-amino-2 - hydroxy - benzene - 5 - sulphonamido→pyrazolobenzimidazole of the formula:

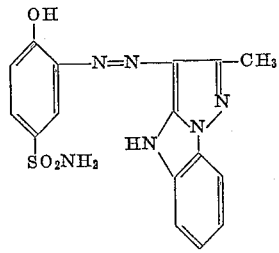

are introduced into 200 parts by volume of formamide, heated to 100° C. and mixed, within 30 minutes, with 2.2 parts by weight of sodium bichromate. Stirring is continued for 75 minutes at 100° C. and the solution of the chromium complex dyestuff then poured into 1000 parts by volume of water. The 2:1-chromium complex is separated out by sprinkling in of 120 parts by weight of rock salt. After filtering off with suction and drying, a dark powder is obtained which readily dissolves in water and dyes wool from a neutral to organic acidic bath in clear ruby shades.

*Example 19*

135 parts by weight of the monazo dyestuff 1-amino-2-hydroxy-benzene-5-sulphonamide→1 - phenyl-3-methyl-5-pyrazolone are introduced into 300 parts by volume of ethylene glycol, treated with 96.5 parts by weight of crystallized chromic chloride and converted into the 1:1-chromium complex dyestuff by heating to 120–130° C. for 21 hours, whilst stirring. The reaction mixture is then allowed to cool down to 100° C. and 129 parts by weight of the monoazo dyestuff 1 - amino - 2 - carboxybenzene→1 - (2' - chlorophenyl)-3-methyl-5-pyrazolone and 125 parts by volume of formamide are added. The temperature is maintained for another hour at 100° C. and the reaction solution is then poured into 1500 parts by volume of water. The 2:1-chromium complex dyestuff is precipitated by sprinkling in 480 parts by weight of sodium chloride. After filtering off with suction and drying, a brown powder is obtained which dyes wool from a neutral to organic acid bath in clear yellowish-orange shades.

*Example 20*

24.8 parts by weight of the monoazo dyestuff 1-amino-2 - hydroxy - benzene - 5 - sulphonamide→β-naphthol are introduced into 100 parts by volume of ethylene glycol, treated with 19.25 parts by weight of crystallized chromic chloride and stirred for 5 hours at 140° C. To the reaction mixture containing the 1:1-chromium complex dyestuff is added 50 parts by volume of formamide and 27 parts by weight of the monoazo dyestuff 1-amino-2-hydroxybenzene-5-sulphonamide→1-phenyl - 3 - methyl-5 - pyrazolone and the mixture is stirred for 25 minutes at 110° C. The reaction solution is poured into 3000 parts by volume of water and the 2:1-mixed chromium complex is precipitated by sprinkling in 360 parts by weight of sodium chloride. After filtering off with suction and drying, a dark powder is obtained which easily dissolves in water and dyes wool from a neutral to organic acid bath in reddish-brown shades.

*Example 21*

29.1 parts by weight of the monoazo dyestuff 1-amino-2 - hydroxy - 5 - nitrobenzene→1 - methylsulphonylamino-7-hydroxynaphthalene in 100 parts by volume of ethylene glycol, with 19.25 parts by weight of crystallized chromic chloride, are converted into the 1:1-chromium complex dyestuff by heating for 5 hours to 140° C. 50 parts by volume of formamide and 27.2 parts by weight of the monoazo dyestuff 1 - amino - 2 - hydroxybenzene - 5-sulphonamide→acetoacetic acid anilide are then added to the reaction mixture and the latter is stirred for 20 minutes at 110° C. In order to isolate the 2:1-mixed chromium complex dyestuff, the mixture is poured into 3000 parts by volume of water and 90 parts by weight of sodium chloride are sprinkled in. After filtering off with suction and drying, a dark powder is obtained which easily dissolves in water and dyes wool from a neutral to organic acid bath in olive green shades.

*Example 22*

6.80 parts by weight of the monoazo dyestuff

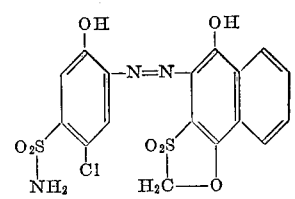

obtained from diazotized 1 - amino - 2 - hydroxy - 5-chlorobenzene - 4 - sulphonamide and 4' - hydroxynaphthol - (2',1':4,5) - oxathiol - S - dioxide are introduced into 50 parts by volume of ethylene glycol, treated with 3.85 parts by weight of chromic chloride and converted into the 1:1-chromium complex by heating for 5 hours to 140° C. The reaction mixture is allowed to cool down to 130° C., 25 parts by volume of formamide and 5.87 parts by weight of the monoazo dyestuff 1-amino-2 - carboxybenzene→acetoacetic acid anilide are added and the mixture is stirred for 15 minutes at 100–105° C. The reaction solution is then poured into 600 parts by volume of water. The 2:1-mixed chromium complex dyestuff is precipitated by sprinkling in 60 parts by weight of sodium chloride. After filtering off with suction and drying a dark powder is obtained which dissolves in water and dyes wool from a neutral to organic acid bath in clear green shades.

*Example 23*

43.5 parts by weight of the monoazo dyestuff 1-amino-2,5 - dimethoxy - 4 - chlorobenzene→2 - hydroxy - 8-methylsulfonyl-amino-naphthalene are stirred with 200 parts by volume of ethylene glycol, treated with 26.6 parts by weight of chromium-III-chloride and heated to 155° C. for 4 hours. The reaction mixture is then cooled down to 110° C., 32.5 parts by weight of the monoazo dyestuff 1 - amino - 2 - carboxybenzene→acetoacetic anilide and 400 parts by volume of formamide added. The temperature of the mixture is kept at 110° C. for 25 minutes and the reaction solution then poured into 4000 parts by volume of water, warmed to 50° C. and previously treated with 58 parts by volume of 40 percent soda-lye. The dyestuff can thus be dissolved. It is isolated by the addition of 110 parts by weight of rock salt, filtered off with suction and dried at 60° C. in vacuum. The dry dyestuff represents a dark powder which is soluble in water and which dyes wool from neutral bath clear and fast green shades.

We claim:

1. An asymmetrical chromium mixed complex azo dyestuff of the formula

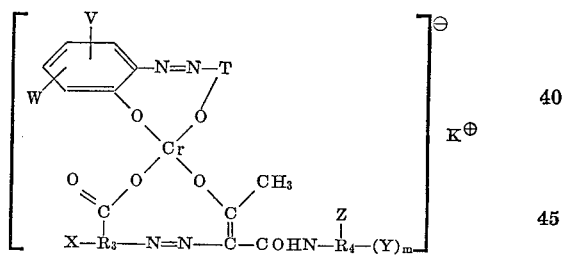

wherein K is a cation; V is a member selected from the group consisting of hydrogen, chloro, methoxy and nitro; W is a member selected from the group consisting of hydrogen and chloro; T is the residue of a naphthol coupling component wherein the azo bridge and —O— stand in o-position to each other; $R_3$ is a radical of the benzene series wherein the —COO— group is in o-position to the azo bridge; $R_4$ is a monocyclic 6-membered aryl radical; X is a member selected from the group consisting of hydrogen, sulfonamido, lower alkyl sulfonamido, lower alkyl sulfone, nitro and chloro; Y is a member selected from the group consisting of hydrogen, lower alkyl, lower alkoxy and chloro; m is an integer of 1–2; and Z is a member selected from the group consisting of hydrogen and chloro.

2. The mixed 2:1-chromium complex of the dyestuffs of the formula

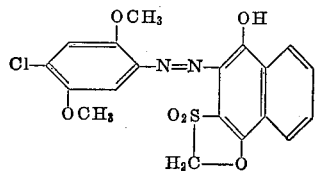

and

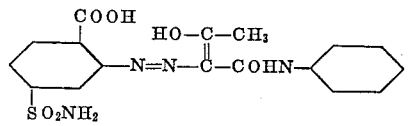

3. The mixed 2:1-chromium complex of the dyestuffs of the formula

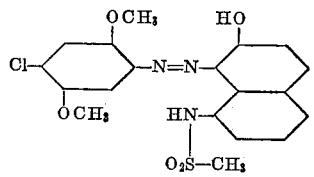

and

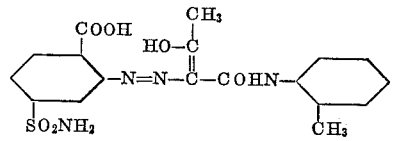

References Cited by the Examiner

UNITED STATES PATENTS

| | | | |
|---|---|---|---|
| 2,230,686 | 2/1941 | Holzach et al. | 260—145 |
| 2,352,701 | 7/1944 | Fischer et al. | 260—145 |
| 2,767,166 | 10/1956 | Strobel et al. | 260—145 X |
| 2,820,782 | 1/1958 | Maderni et al. | 260—145 |
| 2,891,939 | 6/1959 | Schetty | 260—145 |
| 2,906,746 | 9/1959 | Brassel et al. | 260—145 |
| 3,005,813 | 10/1961 | Brassel et al. | 260—145 |
| 3,040,019 | 6/1962 | Neier | 260—145 |
| 3,062,806 | 11/1962 | Biedermann et al. | 260—145 X |
| 3,067,191 | 12/1962 | North et al. | 260—145 |
| 3,132,130 | 5/1964 | Beffa et al. | 260—149 X |

CHARLES B. PARKER, *Primary Examiner.*